US007475121B2

(12) United States Patent
Ushigusa

(10) Patent No.: US 7,475,121 B2
(45) Date of Patent: Jan. 6, 2009

(54) INFORMATION DISTRIBUTION APPARATUS AND INFORMATION DISTRIBUTION METHOD

(75) Inventor: Osami Ushigusa, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 09/866,680

(22) Filed: May 30, 2001

(65) Prior Publication Data

US 2002/0095466 A1 Jul. 18, 2002

(30) Foreign Application Priority Data

Jan. 12, 2001 (JP) ............................. 2001-005405

(51) Int. Cl.
G06F 15/16 (2006.01)
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)

(52) U.S. Cl. ....................... 709/217; 709/203; 709/206; 715/204

(58) Field of Classification Search ................. 709/201, 709/246, 203–207, 202, 217–238; 705/14, 705/27; 707/1–5, 100; 379/93.24, 93; 715/204
See application file for complete search history.

(56) References Cited

U.S. PATENT DOCUMENTS

| 5,493,692 A | * | 2/1996 | Theimer et al. | ............. 455/26.1 |
| 5,832,221 A | * | 11/1998 | Jones | .......................... 709/206 |
| 6,041,310 A | * | 3/2000 | Green et al. | ................... 705/27 |
| 6,047,310 A | | 4/2000 | Kamakura et al. | |
| 6,327,590 B1 | * | 12/2001 | Chidlovskii et al. | ............. 707/5 |
| 6,338,044 B1 | * | 1/2002 | Cook et al. | .................... 705/14 |
| 6,460,036 B1 | * | 10/2002 | Herz | ............................ 707/10 |

(Continued)

FOREIGN PATENT DOCUMENTS

JP 9-91358 4/1997

(Continued)

*Primary Examiner*—Saleh Najjar
*Assistant Examiner*—Asad M Nawaz
(74) *Attorney, Agent, or Firm*—Staas & Halsey LLP

(57) ABSTRACT

The present invention relates to an information distribution apparatus that is capable of enhancing convenience of a receiver by adjusting the amount of information distributed to the receiver in accordance with receiver's desire. Each user can select either of a plurality of distribution ranks containing the designation of a summarization degree with respect to mail distributed from each advertiser, and a distribution rank selected by a user is stored in a mail server. When there is a request for distribution of mail from an advertiser, in the case where a distribution rank is designated by a user who is a receiver of the mail, with respect to the mail of the advertiser, the mail server summarizes the contents of the mail in accordance with the designation of a summarization degree of the designated distribution rank, and send them to the user. Furthermore, user's evaluation and questionnaire information are passed to each advertiser through the mail server.

21 Claims, 11 Drawing Sheets

U.S. PATENT DOCUMENTS

| | | | |
|---|---|---|---|
| 6,493,702 B1 * | 12/2002 | Adar et al. | 707/3 |
| 6,587,755 B1 * | 7/2003 | Smith et al. | 701/1 |
| 6,631,496 B1 * | 10/2003 | Li et al. | 715/501.1 |
| 6,842,604 B1 * | 1/2005 | Cook et al. | 455/3.06 |
| 6,915,295 B2 * | 7/2005 | Okamoto et al. | 707/3 |
| 6,968,332 B1 * | 11/2005 | Milic-Frayling et al. | 707/3 |
| 7,031,961 B2 * | 4/2006 | Pitkow et al. | 707/4 |
| 7,043,486 B2 * | 5/2006 | Cope | 707/100 |
| 2002/0020349 A1 * | 2/2002 | Woodnorth et al. | 118/500 |
| 2002/0026349 A1 * | 2/2002 | Reilly et al. | 705/14 |
| 2002/0052967 A1 * | 5/2002 | Goldhor et al. | 709/231 |
| 2002/0169835 A1 * | 11/2002 | Paul et al. | 709/206 |
| 2004/0064576 A1 * | 4/2004 | Goldhor et al. | 709/232 |

FOREIGN PATENT DOCUMENTS

JP          9-200254          7/1997

* cited by examiner

| User | Sender's address | Rank |
|---|---|---|
| × × × × | SHOP@NET | C |
| | MALL@NET | D |
| △ △ △ △ | SHOP@NET | D |
| | HOBBY@NET | A |
| | NEWS@NET | B |

☆★☆★☆★☆★☆★SHOP NET News January 2001☆★☆★☆★☆★☆★

◆Advertisement◆ ················································

☆xxx The number of members topped 50,000 xxxxxxx

☆xxxxxxxxxxxxxxxxxxxxxxxxxxxxxxxxxxxxxxxxx

☆xxx Why don't you join us? xxxxxxx

☆ http://aaa.com/Start.htm

····················································································

■SHOP NET　Hot News
- Let's go to Hawaii by xxx!

SHOP NET has a tie-up with XXX Corp. dedicated to outdoor goods to give you a nice present (special limited-time offer).

During the campaign, two people among those who give a correct answer can go to Hawaii by lottery For more information http://aaa.com/News.htm ■Latest Contents Information
- Mini-features [WebXX]

Recently, the scope of contents is being remarkably broadened, [WebXX] site.

Particularly, filled with interviews with people of interest, people and things most talked about. We will introduce some of them to you.

For more information http://aaa.com/Special.htm

FIG. 5B

☆★☆★☆★☆★☆★SHOP NET News January 2001☆★☆★☆★☆★☆★

◆Advertisement◆ ················································

☆xxx The number of members topped 50,000 xxxxxxx

■SHOP NET　Hot News
- Let's go to Hawaii by xxx!

■Latest Contents Information
- Mini-features [WebXX]

FIG. 5C

■■　SHOP NET News January 2001　■■

(Advertisement) Why don't you join us? xxx　　http://aaa.com/Start.htm

<1> SHOP NET　Hot News　　Let's go to Hawaii by xxx!
- Two people can go to Hawaii by lottery　　http://aaa.com/News.htm <2> Latest Contents Information　Mini-features [WebXX]
- [WebXX] site with broaden contents　　Filled with topics For more information http://aaa.com/Special.htm 33 ─── ············· rank-ok sum ·············

31 {
■■ SHOP NET News January 2001 ■■
(Advertisement) Why don't you join us? xxx   http://aaa.com/Start.htm
<1> SHOP NET   Hot News   Let's go to Hawaii by xxx!
 • Two people can go to Hawaii by lottery   http://aaa.com/News.htm
<2> Latest Contents Information   Mini-features [WebXX]
 • [WebXX] site with broaden contents   Filled with topics
     For more information http://aaa.com/Special.htm 34 ─── ············· rank-ok org ·············

32 {
☆★☆★☆★☆★☆★SHOP NET News January 2001☆★☆★☆★☆★☆★
◆Advertisement◆ ·············
☆xxx The number of members topped 50,000 xxxxxxx
☆xxxxxxxxxxxxxxxxxxxxxxxxxxxxxxxxxxxxxxxxxxxx
☆xxx Why don't you join us? xxxxxxx
☆  http://aaa.com/Start.htm
·····································································

■SHOP NET   Hot News
• Let's go to Hawaii by xxx!
    SHOP NET has a tie-up with XXX Corp. dedicated to outdoor goods
    to give you a nice present (special limited-time offer).
    During the campaign, two people among those who give a correct
    answer can go to Hawaii by lottery
    For more information http://aaa.com/News.htm
■Latest Contents Information
• Mini-features [WebXX]
    Recently, the scope of contents is being remarkably broadened,
      [WebXX] site.
    Particularly, filled with interviews with people of interest, people
    and things most talked about. We will introduce some of them to
    you.
    For more information http://aaa.com/Special.htm

FIG. 6

| Reason ID | Display contents |
|---|---|
| R1 | Because I became less interested in goods after purchase. |
| R2 | Becasue the amount of information is too large |
| R3 | Because the frequency of mail transmission is too high |
| R4 | For collecting information of goods |
| R5 | Becasue there is an interesting article |

| Reason ID | Display contents |
|---|---|
| C1 | Price information of personal computers |
| C2 | Function information of personal computers |
| C3 | Price information of software |
| C4 | Function information of business software |
| C5 | Function information of hobby software |

Sender : SHOP@NET

Subject name : SHOP@NET Information October 2 version

Distribution rank : A(Entire text/Immediately)

Main body : << Setting/alteration of a rank
→ http : //rank-ok. com/aq942. htm>>

Hello, xxx. The current SHOP@NET
Information is filled with ○○

FIG. 11

Sender : rank-ok@NET

Subject name : C rank mail

Main body : << Setting of a rank/retransmission
of an original
→ http : //rank-ok. com/sel 942.cgi>>

Sender 1 : Subject name x x x x x x (Abstract) x x x x x x x x x x x x ···

Sender 2 : Subject nama x x x x x x (Abstract) x x x x x x x x x x x x ···

FIG. 12

Mr./Ms. xxx

Please select alteration of a rank or of retransmission of an original

|  | Rank | Original |
|---|---|---|
| Sender 1: Subject name xxxxx | ■ | ☐ |
| Sender 2: Subject name xxxxx | ■ | ☐ |
| Sender 3: Subject name xxxxx | ☐ | ■ |
| Sender 4: Subject name xxxxx | ☐ | ☐ |

62 — Determination

61

| Sender | User | Rank | Answer to a questionnaire | Comment |
|---|---|---|---|---|
| SHOP@NET | × × × × | C | R1 | J-POP information is good |
| | △△△△ | D | R2 | |

FIG. 15

INFORMATION DISTRIBUTION APPARATUS AND INFORMATION DISTRIBUTION METHOD

BACKGROUND OF THE INVENTION

1. Field of the Invention

The present invention relates to an information distribution system for distributing electronic information such as electronic mail. In particular, the present invention relates to an information distribution apparatus and an information distribution method for mediating information distribution from a sending apparatus of an advertiser or the like to a receiving apparatus of a user or the like.

2. Description of the Related Art

With the recent development of information equipment and a communication foundation, an environment in which anybody can easily utilize the Internet is being established. Along with this, so-called on-line shopping is generally conducted, in which a number of companies provide virtual shops on the Internet, and consumers access them.

When a consumer buys something or requests a catalogue at a virtual shop on the Internet, the consumer is required to input an electronic mail address for contact. After this, in most cases, an administrator, a publicity agent, or the like of the virtual shop periodically distributes advertising mail and the like to this electronic mail address.

In recent years, due to the rapid spread of mobile phones capable of using the Internet, an Internet access can be made at any place and at any time. Thus, it is expected that the use frequency of on-line shopping and the like is further increased. Furthermore, along with this, it is considered that the number of pieces of advertising mail received by consumers is increased.

However, advertising mail is sent from a service provider on the Internet in one way. Therefore, when the number of pieces of mail and the amount of information are increased, the following problem will occur on the receiving side.

Conventionally, a receiver cannot select mail to be downloaded from a mail server, and all the mail targeted for the receiver and accumulated at the mail server is downloaded. Thus, when the number of pieces of advertising mail and the amount of information thereof are increased, it will take much time for downloading mail from a mail server to a receiver's terminal. Particularly, in the case of a mobile phone terminal that generally adopts a charge system on an as-used basis, when the amount of information of advertising mail is increased, a cost burden on a receiver is increased.

Furthermore, when the number of pieces of advertising mail and the amount of information thereof are increased, it will take much time for a receiver to look through the contents thereof. Particularly, in the case of a mobile phone terminal, since a screen is small, the amount of information that can be displayed at a time is limited. Furthermore, compared with a mailer for a computer, an operation of the mobile phone terminal is complicated, so that the contents of a large amount of mail cannot be checked rapidly.

Conventionally, a system is known that is capable of rejecting reception of mail satisfying particular conditions. In this case, all the mail satisfying the conditions may be deleted uniformly, so that required information may be lost.

Furthermore, for example, JP 9(1997)-200254 discloses an electronic mail display apparatus in which the importance of received mail is determined in accordance with a previously stored rule, and each piece of mail in a list is displayed by a method previously set in accordance with the importance, whereby received mail is efficiently processed on a receiving side. This apparatus is predicated on downloading of the entire text of all the mail from a mail server. Therefore, the above-mentioned problem cannot be solved.

SUMMARY OF THE INVENTION

Therefore, with the foregoing in mind, it is an object of the present invention to provide an information distribution apparatus that enhances convenience of a receiver by allowing the receiver to adjust the amount of information of received mail with a simple operation.

In order to achieve the above-mentioned object, the information distribution apparatus of the present invention for mediating distribution of information from a sending apparatus to a receiving apparatus, includes: a sending/receiving control part for conducting communication with the sending apparatus or the receiving apparatus; a distribution rank storage part for storing a distribution rank selected by each receiver with respect to distribution information from each sender, among distribution ranks defining distribution conditions containing designation of a summarization degree of distribution information in a plurality of levels; a distribution information storage part for storing an original of distribution information from the sending apparatus; and a summarization processing part for, when receiving a request for distribution of information from the sending apparatus through the sending/receiving control part, obtaining a distribution rank selected by the receiver of the distribution information with respect to the distribution information from the sender, from the distribution rank storage part, and conducting summarization processing of distribution information stored in the distribution information storage part in accordance with designation of a summarization degree corresponding to the obtained distribution rank, wherein the distribution information in accordance with the distribution rank is distributed from the sending/receiving control part to each receiving apparatus.

According to the above-mentioned configuration, a receiver of information previously designates a distribution rank, whereby the summarization processing part summarizes distribution information in accordance with the designated distribution rank. More specifically, the receiver can adjust the amount of contents of distribution information in levels in accordance with a degree of interest and the like, so that information which is not so interesting is summarized to reduce the amount of information to be received. Because of this, there is an advantage that the receiver can shorten a time required for receiving the information and eliminate time and trouble for confirming the contents by displaying the entire information. Consequently, an information distribution apparatus can be provided that allows a receiver to adjust the amount of information to be received as required with a simple operation, thereby enhancing the convenience of the receiver.

It is preferable that the above-mentioned information distribution apparatus includes a retransmission processing part for receiving a request for transmission of an original of distribution information from a receiver of distribution information subjected to the summarization processing, extracting an original stored in the distribution information storage part, and distributing the original to the receiving apparatus through the sending/receiving control part.

According to the above-mentioned configuration, in the case where a receiver sees summarized distribution information and feels an interest in it, he/she can see the original of the information by making a request for transmission of the original. Because of this, if required, the receiver can obtain information lost by summarization processing, which further enhances the convenience of the receiver.

It is preferable that the above-mentioned information distribution apparatus includes a rank information passing part for totalizing distribution ranks stored in the distribution rank storage part, and sending the totalized result to the sending apparatus through the sending/receiving control part. According to this configuration, there is an advantage that a sender of distribution information can efficiently obtain evaluation by receivers on the distributed information.

It is preferable that the above-mentioned information distribution apparatus includes an image information generating part for adding screen definition information of a rank setting screen for allowing a receiver to input the distribution rank by selection, or access information to the rank setting screen to each distribution information; and a distribution rank updating part for updating contents stored in the distribution rank storage part, based on a selection result which a receiver inputs by selection on the rank setting screen.

According to this configuration, a receiver can easily set a distribution rank on a rank setting screen additionally displayed on a display screen of distribution information or a rank setting screen accessible from the display screen of distribution information in the receiving apparatus. Furthermore, the distribution rank selected by the receiver is stored in the distribution rank storage part by the distribution rank updating part.

In the above-mentioned information distribution apparatus, it is preferable that the rank setting screen includes a questionnaire column in addition to a selection column of the distribution rank, and the information distribution apparatus includes: a questionnaire result storage part for storing answer data to the questionnaire column; a questionnaire record updating part for receiving answer data to the questionnaire column from the receiving apparatus through the sending/receiving control part, and updating contents stored in the questionnaire result storage part; and a questionnaire information passing part for totalizing questionnaire results stored in the questionnaire result storage part, and sending the totalized result to the sending apparatus through the sending/receiving control part.

According to the above-mentioned configuration, a survey can be conducted on a rank setting screen used for setting a distribution rank. Therefore, a sender can efficiently collect opinions and the like of a receiver with respect to distribution information.

In the above-mentioned information distribution apparatus, it is preferable that the distribution rank storage part includes a region for storing a distribution rank selected by each receiver on a sender basis or on the basis of the kind of information distributed from each sender.

According to the above-mentioned configuration, a sender of distribution information can set a distribution rank on the basis of a sender of distribution information or on the basis of the kind of information in the case where the same sender distributes a plurality of kinds of information.

It is preferable that the above-mentioned information distribution apparatus includes a menu storage part for storing predetermined questionnaire contents and questionnaire contents provided by each sender, wherein questionnaire contents to be displayed in the questionnaire column on the rank setting screen are selected by each sender from questionnaire contents stored in the menu storage part.

According to the above-mentioned configuration, a sender can conduct a survey of predetermined contents set by an administrator or the like of the information distribution apparatus, or can conduct his/her own survey by providing questionnaire contents created by the sender. In the case of requesting the sender to pay a use fee of the information distribution apparatus, an amount to be billed may be varied depending upon which questionnaire contents are used.

In the above-mentioned information distribution apparatus, it is preferable that summarization processing of distribution information by the summarization processing part is either one of the following processing selected by each sender: processing of conducting summarization based on a predetermined rule and processing of outputting an abstract previously provided together with the distribution information in accordance with each distribution rank from the sender as a summarized result.

According to the above-mentioned configuration, a sender can distribute a summarized result based on a predetermined rule set by an administrator or the like of the information distribution apparatus or distribute only summarized distribution information created by the sender. In the case of requesting the sender to pay a use fee of the information distribution apparatus, an amount to be billed may be varied depending upon which summarization processing of distribution information is selected.

It is preferable that the above-mentioned information distribution apparatus includes a standard rank determining part for determining an initial distribution rank based on evaluation by a plurality of receivers.

The initial distribution rank refers to a distribution rank used in the case where a receiver does not designate a distribution rank. According to this configuration, a distribution rank higher than that of distribution information with lower evaluation is set as an initial rank with respect to distribution information with higher evaluation by a number of receivers, whereby, in the case where a distribution rank is not designated, distribution information considered to be significant to the receiver is distributed in a state closer to the original. Because of this, compared with the case where an initial distribution rank is set in either distribution rank in a uniform manner, information distribution can be conducted in a summarized state in accordance with a degree of receiver's interest.

Furthermore, the information distribution method of the present invention is a method for mediating distribution of information from a sending apparatus to a receiving apparatus, including: storing a distribution rank selected by each receiver with respect to distribution information from each sender, among distribution ranks defining distribution conditions containing designation of a summarization degree of distribution information in a plurality of levels, in a distribution rank storage part; when receiving a request for distribution of information from the sending apparatus, obtaining a distribution rank, which is selected by a receiver of the distribution information with respect to the distribution information from the sender, from the distribution rank storage part; and summarizing the distribution information in accordance with designation of a summarization degree corresponding to the obtained distribution rank to send it to the receiving apparatus.

According to the above-mentioned method, a receiver of information selects a distribution rank in accordance with a degree of interest, whereby the amount of contents of distribution information can be adjusted. More specifically, information that is not so interesting can be summarized to reduce the amount of information to be received. Because of this, in the receiving apparatus, a time required for receiving the information can be shortened, and time and trouble for confirming the contents by displaying the entire information can be eliminated.

These and other advantages of the present invention will become apparent to those skilled in the art upon reading and understanding the following detailed description with reference to the accompanying figures.

BRIEF DESCRIPTION OF THE DRAWINGS

FIG. 3 illustrates an example of contents stored in a user information storage part provided at a mail server in the mail distribution system.

FIG. 5A illustrates an example of an original of advertising mail, FIG. 5B illustrates an example of an abstract of the original created in accordance with a predetermined rule by the mail server, and FIG. 5C illustrates an example of an abstract of the original provided by an advertiser.

FIG. 6 illustrates an example of an original of mail in the case where an advertiser provides an abstract.

FIG. 11 illustrates a display example of advertising mail in Rank A at a user terminal.

FIG. 12 illustrates a display example of advertising mail in Rank C at a user terminal.

FIG. 15 illustrates an example of information passed to an advertiser by the mail server.

DESCRIPTION OF THE PREFERRED EMBODIMENTS

Hereinafter, the present invention will be described by way of an embodiment with reference to the drawings.

In the present embodiment, a mail distribution system adopting an information distribution apparatus of the present invention will be described.

Figure 1:
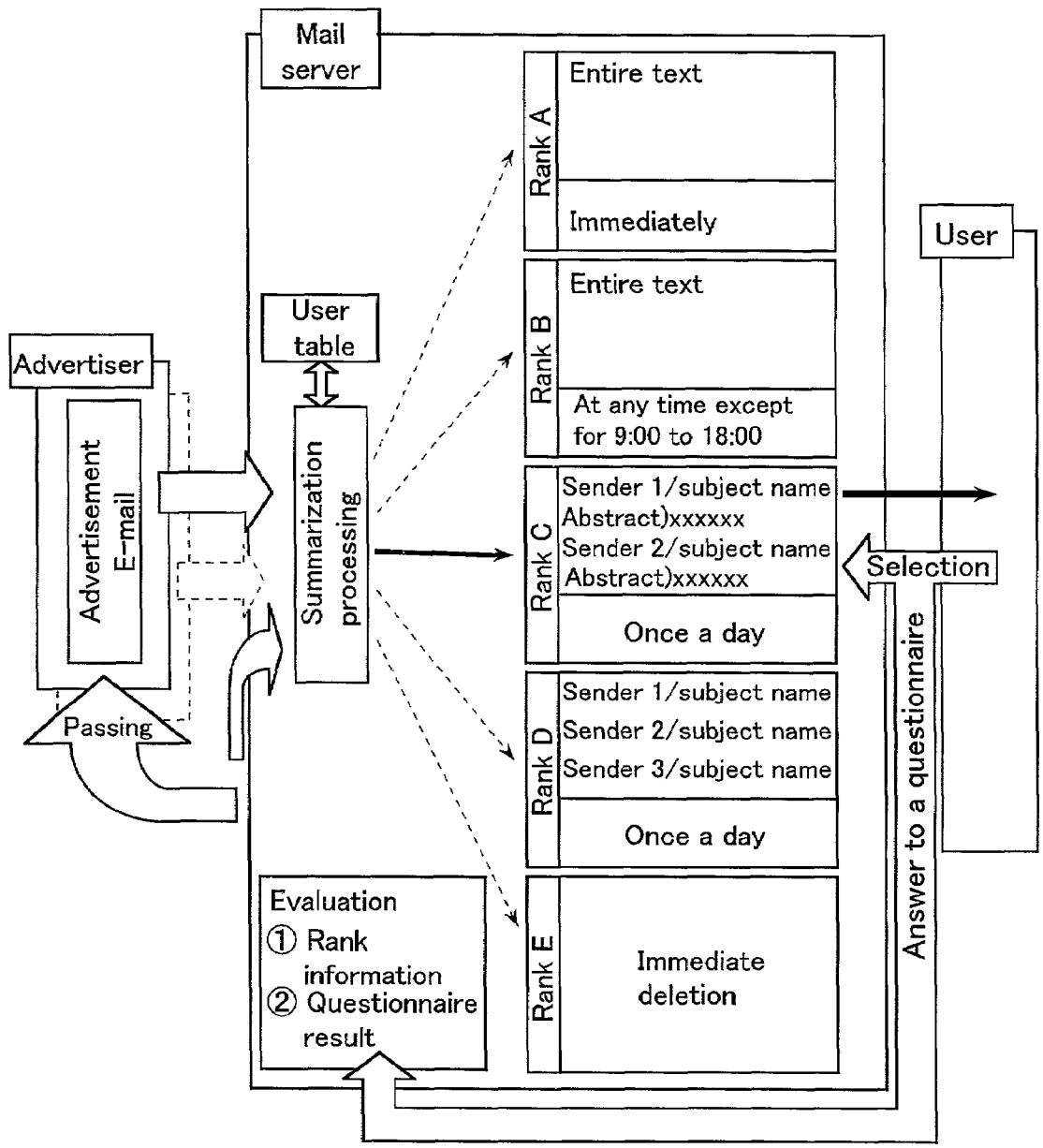
FIG. 1 schematically illustrates an arrangement of a mail distribution system of one embodiment according to the present invention.

FIG. 1 schematically shows an arrangement of a mail distribution system. The mail distribution system is realized on a communication network such as the Internet, and is provided with a mail server (information distribution apparatus) that mediates distribution of electronic mail between a company (advertiser), etc. and a consumer (user), etc.

Advertising mail (hereinafter, merely referred to as "mail") and the like from an advertiser is distributed to each user through a mail server of a provider with which each user (receiver) has a contract. Conventionally, in general, the entire text of mail sent to the mail server from a sending apparatus are unconditionally passed from the mail server to a user terminal. However, according to the mail distribution system, in order to adjust the amount of information of distribution mail in accordance with receiver's desire, each receiver can designate a rank regarding distribution conditions of mail, and a mail server summarizes mail in accordance with the designated rank.

More specifically, if a receiver of mail from an advertiser once designates a distribution rank, the subsequent mail from the advertiser is distributed by being summarized in accordance with the designated distribution rank. The once designated distribution rank can be altered, which is described later.

A mail distribution rank previously defines distribution conditions containing the designation of a summarization degree of mail in a plurality of levels. In an example shown in FIG. 1, a distribution rank in 5 levels (A to E) is provided, and distribution conditions are defined by a combination of the designation of a summarization degree and the designation of a distribution time.

The designation of a summarization degree means to which degree the amount of information of each piece of mail is reduced. In the example shown in FIG. 1, in the case of Ranks A and B, the entire text is sent without reducing the amount of information of each piece of mail; in the case of Rank C, a subject name and an abstract are sent; in the case of Rank D, only a subject name is sent; and in the case of Rank E, mail is abandoned (i.e., 100% deleted). Thus, the designation of a summarization degree is defined. The contents of the designation of a summarization degree are not limited to this example, and they can be arbitrarily set in each system.

The designation of a distribution time means a timing at which mail is sent from a mail server to each receiver. In the example shown in FIG. 1, "immediately" is designated in Rank A, which means that mail is sent to a receiver as soon as it arrives from a sending apparatus to a mail server. In Rank B, "predetermined time" is designated, and in Ranks C and D, "once a day" is designated. The contents of the designation of a distribution time can also be variously set.

The distribution rank in FIG. 1 is shown for illustrative purpose, and the number of levels in the distribution rank and the distribution conditions of each rank can be arbitrarily set in each system. For example, in this example, the designation of a summarization degree and the designation of a distribution time are defined as distribution conditions. However, the distribution rank may be defined only by the designation of a summarization degree, or the designation of a summarization degree may be combined with the conditions other than the designation of a distribution time. Furthermore, a distribution time may be designated in accordance with user's convenience.

A user can select a distribution rank which the user desires, from a distribution rank in a plurality of levels previously defined as described above. The rank information selected by each user is held in a user table.

For example, if a user selects the above-mentioned Rank C with respect to advertising mail from an advertiser, when there is a request for distribution of mail from the same advertiser to the user, a mail server summarizes advertising mail from the advertiser in subject names and abstracts in accordance with the designation of a summarization degree of Rank C selected by the user. Furthermore, since the designation of a distribution time in Rank C is "once a day", the summarized advertising mail is brought together with another mail in the same Rank C as shown in FIG. 1, and sent to the user at a predetermined timing (i.e., once a day).

Figures 7, 8:
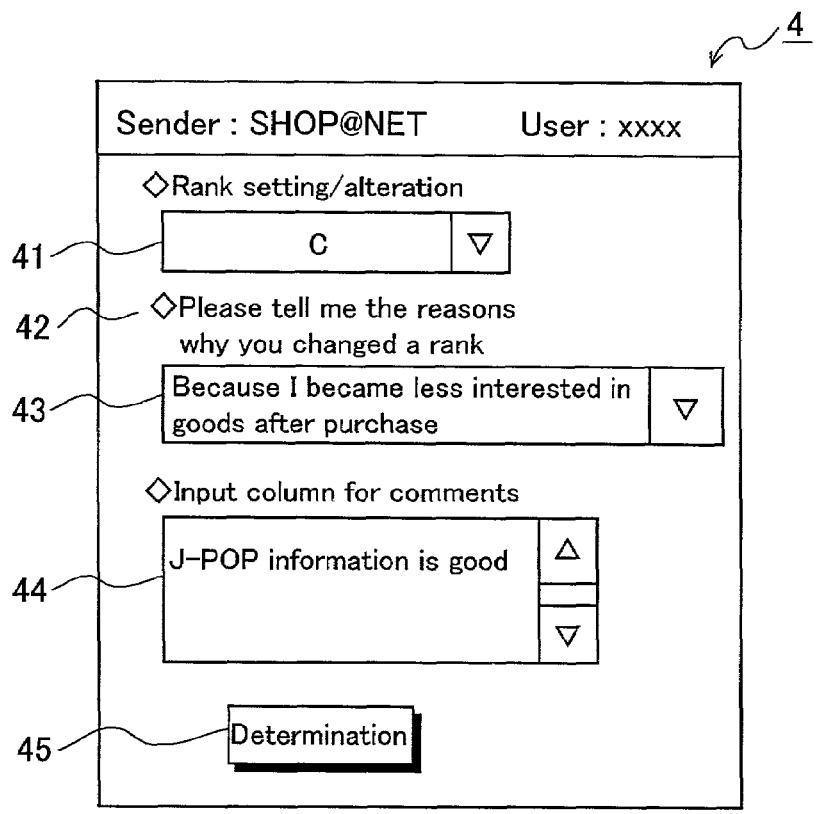
FIG. 7 illustrates an example of a rank setting screen displayed at a user terminal.
FIG. 8 illustrates an example of a standard menu displayed in a questionnaire column on the rank setting screen.

Furthermore, in the mail distribution system, in order to allow each user to select a distribution rank, a rank setting screen as shown in FIG. 7 is displayed to a user terminal, which is described later. In the rank setting screen, a rank setting column and a questionnaire column are provided.

Furthermore, in accordance with advertiser's desire, each advertiser can also conduct its own survey, using this questionnaire column, which is also described later. The rank information and the answer to a question input through the rank setting screen by a user are passed to an advertiser through a mail server, as shown in FIG. 1.

As described above, in the mail distribution system, each user can adjust the amount of information of advertising mail from each advertiser in accordance with the degree of user's interest and the like, and a waste of cost and time due to unwanted advertising mail can be avoided. Furthermore, there is an advantage that an advertiser can get the evaluation on advertising mail, opinions of users, and the like.

Hereinafter, a configuration and an operation of the mail distribution system will be described in more detail.

Figure 2:
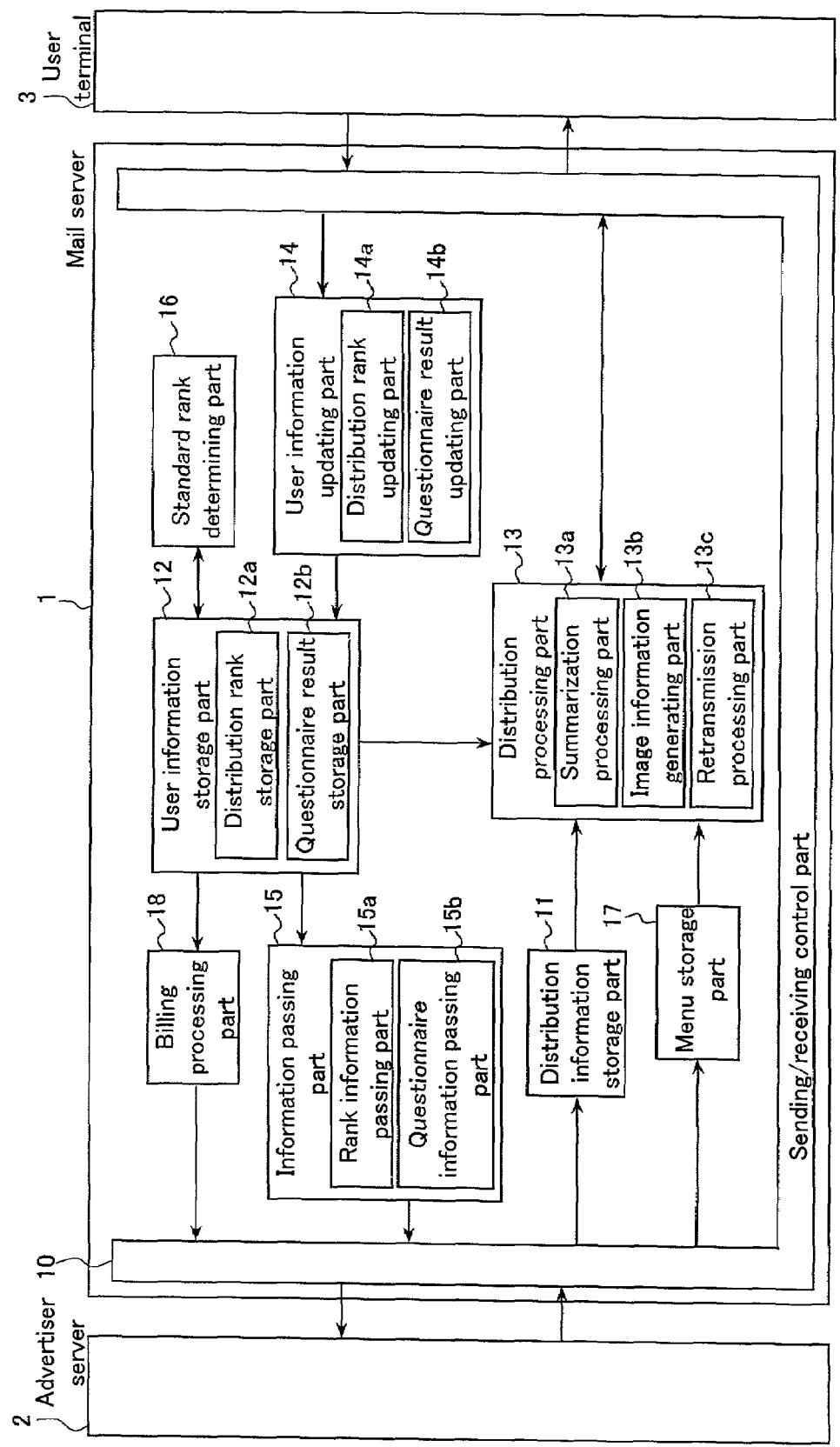
FIG. 2 is a block diagram showing an example of a configuration of the mail distribution system.

First, the configuration of the mail distribution system will be described. As shown in FIG. 2, the mail distribution system includes a mail server 1 (information distribution apparatus), an advertiser server 2 (sending apparatus), and a user terminal 3 (receiving apparatus). The mail server 1 is connected to the advertiser server 2 through a communication network (not shown) such as the Internet. Similarly, the mail server 1 is connected to the user terminal 3 through the communication network. Herein, although a sending apparatus is prescribed to be a server, the sending apparatus is not limited to the server, and any computer such as a personal computer can be used.

FIG. 2 shows only one advertiser server 2 connected to the mail server 1. However, the mail server 1 can be connected to a plurality of advertiser servers 2. Similarly, the mail server 1 can be connected to a plurality of user terminals 3.

As the user terminal 3, a mobile phone, a portable information terminal, etc. having a mail function and an Internet access function can be used. The user terminal 3 may be a general personal computer. In the case where a personal computer is used as the user terminal 3, the mail server 1 may be connected to the user terminal 3 all the time. Alternatively, when a user conducts a connecting operation, the user terminal 3 may establish connection with the mail server 1. Alternatively, when mail is to be distributed, the mail server 1 may establish connection with the user terminal 3.

First, a configuration of the mail server 1 and a function of each part thereof will be outlined with reference to FIG. 2. As shown in FIG. 2, the mail server 1 includes a sending/receiving control part 10, a distribution information storage part 11, a user information storage part 12, a distribution processing part 13, a user information updating part 14, an information passing part 15, a standard rank determining part 16, a menu storage part 17, and a billing processing part 18.

The distribution information storage part 11, the user information storage part 12, and the menu storage part 17 are realized by a storage apparatus such as a memory and a hard disk. The distribution processing part 13, the user information updating part 14, the information passing part 15, the standard rank determining part 16, and the billing processing part 18 can be realized by a CPU that operates by reading a predetermined program.

The sending/receiving control part 10 controls sending/receiving of data with respect to the advertiser server 2, the user terminal 3, other apparatuses on the communication network, and the like, in accordance with a predetermined protocol. The distribution information storage part 11 stores mail and the like, which are requested for distribution by the advertiser server 2.

The user information storage part 12 has at least a distribution rank storage part 12a and a questionnaire result storage part 12b. As shown in an example in FIG. 3, the distribution rank storage part 12a stores a mail address of each user, a sender's address of mail whose distribution rank is designated by each user, and a distribution rank designated by each user. The sender's address is an address of the advertiser server 2. The results of a questionnaire sent from the user terminal 3 are accumulated in the questionnaire result storage part 12b, which is described later.

In the example shown in FIG. 3, the distribution rank storage part 12a stores a rank designated on an advertiser server basis. However, for example, in the case where an advertiser distributes a plurality of kinds of advertising mail, rank designation may be stored every kind of advertising mail. In general, advertising mail and the like have a distinctive characteristic in a subject name (title), so that the kind of mail can be identified based on a subject name.

The user information updating part 14 includes a distribution rank updating part 14a and a questionnaire result updating part 14b, and updates the contents stored in the distribution rank storage part 12a and the questionnaire result storage part 12b of the user information storage part 12 in accordance with the distribution rank and the results of a questionnaire sent from the user terminal 3.

The distribution processing part 13 includes a summarization processing part 13a, a screen information generating part 13b, and a retransmission processing part 13c, and sends advertising mail, which is requested for distribution by the advertiser server 2, to the user terminal 3 through the sending/receiving control part 10.

The summarization processing part 13a summarizes the above-mentioned advertising mail. This summarization processing is conducted in accordance with the distribution rank stored in the distribution rank storage part 12a of the user information storage part 12, which is described later.

The screen information generating part 13b generates HTML of a rank setting screen to be displayed by the user terminal 3 so that a user can set a distribution rank from the user terminal 3. The distribution processing part 13 attaches the URL of the generated HTML to advertising mail to be distributed. Because of this, a user can access the rank setting screen merely by clicking the URL at the user terminal 3, which is described later. Herein, although the HTML is illustrated as a screen descriptor, the descriptor is not limited thereto.

When there is a request from a user who read summarized mail for retransmission of the entire text of mail, the retransmission processing part 13c obtains the entire text of mail from the distribution information storage part 11, and sends it to the user terminal 3 through the sending/receiving control part 10.

The information passing part 15 includes a rank information passing part 15a and a questionnaire information passing part 15b. Referring to the contents stored in the user information storage part 12, the information passing part 15 aggregates rank evaluation by users with respect to advertising mail of each advertiser and answers to a question, and sends the summarized result to the advertiser server 2 through the sending/receiving control part 10.

The standard rank determining part 16 conducts initial setting of a distribution rank of mail whose rank has not been designated by a user. A distribution rank to be initially set may be any rank previously set in a uniform manner. Alternatively, as described later, the initial distribution rank may be determined based on the evaluation of the mail by other users, i.e., a designation rank by other users stored in the distribution rank storage part 12*a*.

The menu storage part 17 stores a menu displayed in a questionnaire column or the like on the rank setting screen generated by the screen information generating part 13*b*. This menu includes two kinds: a standard menu previously prepared in the mail server 1 and a customized menu for each advertiser to conduct its own survey. Each advertiser can select the standard menu or the customized menu. In the case of using the customized menu, a menu created by the advertiser is previously sent to the mail server 1 and stored in the menu storage part 17. The standard menu is not necessarily limited to one kind. The standard menu can be arbitrarily set; for example, a plurality of kinds of standard menus are classified by the type of business of an advertiser.

Furthermore, the billing processing part 18 conducts processing of calculation of an amount billed with respect to an advertiser.

Hereinafter, an operation of the mail distribution system configured as described above will be described.

Figure 4:
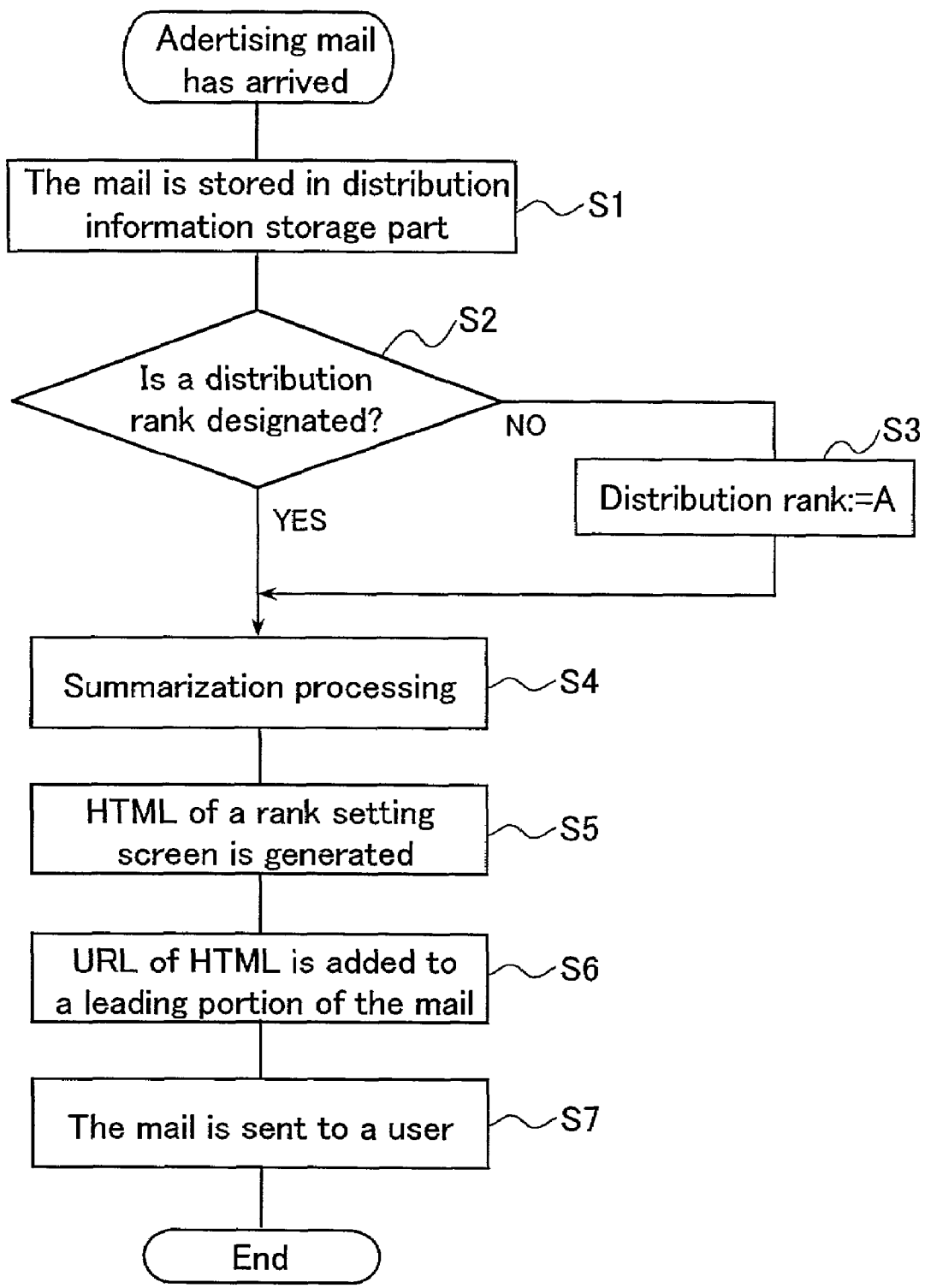
FIG. 4 is a flow chart showing an operation of the mail server when there is a request for distribution of mail.

First, the operation of the mail server 1 will be described with reference to FIG. 4, when there is a request from an advertiser for distribution of advertising mail.

Upon receiving advertising mail from the advertiser server 2, the mail server 1 stores the entire text of the received mail in the distribution information storage part 11 (Operation 1). The mail server 1 determines whether or not a distribution rank is specified by a user who is a receiver of the mail, with respect to the mail from the advertiser server 2 (Operation 2). This determination is conducted based on whether or not there is a record containing a combination of a user name of the receiver of the mail and a sender's address in the distribution rank storage part 12*a* of the user information storage part 12.

Herein, if the determination result at Operation 2 is YES, the summarization processing part 13*a* of the distribution processing part 13 obtains the entire text of the mail stored at Operation 1 from the distribution information storage part 11 and conducts summarization processing in accordance with the designated distribution rank (Operation 4).

On the other hand, if the determination result at Operation 2 is NO, the standard rank determining part 16 conducts initial setting of a distribution rank, and the summarization processing part 13*a* conducts summarization processing in accordance with the initially set distribution rank. Herein, in the case where the distribution rank is not designated, the standard rank determining part 16 initially sets a distribution rank at "Rank A" in a uniform manner (Operation 3), and the process proceeds to Operation 4. The initial distribution rank used at Operation 3 is not limited to "Rank A", and any rank may be used.

In conducting summarization processing at Operation 4, in the case of a distribution rank whose designation of a summarization degree is "entire text" as in the above-mentioned Rank A or B (see FIG. 1), the summarization processing part 13*a* uses the entire text of the mail obtained from the distribution information storage part 11 as a summarized result. Furthermore, in the case where the mail is to be summarized in a subject name and an abstract as in Rank C, the summarization processing part 13*a* creates an abstract in accordance with a predetermined rule.

Herein, a specific example of summarization processing by the summarization processing part 13*a* will be described. The summarization processing part 13*a* creates an abstract in accordance with a rule, for example, in which a predetermined number of lines each having, at a leading end, a symbol (star mark, diamond mark, square mark, or the like) often used as a leading letter in a title or a headline are extracted from the leading portion of a main body of mail. In the case where the same symbol is continued at the leading ends in two or more lines, only the first line is extracted.

For example, in the case where the entire text of mail is as shown in FIG. 5A, when an abstract of 7 lines is created in accordance with the above-mentioned rule, the result as shown in FIG. 5B is obtained. The rule of an abstract illustrated here is an example, so that the rule is not limited thereto. Furthermore, the number of lines of an abstract to be created may be arbitrarily set.

In the case of automatic summarization by the summarization processing part 13*a*, as in the second and third lines of the abstract shown in FIG. 5B, those which are not so significant may be extracted. Therefore, according to the mail distribution system, if an advertiser desires, an abstract, for example, as shown in FIG. 5C created by an advertiser can also be used in place of the abstract result created by the summarization processing part 13*a*.

In this case, in requesting distribution of advertising mail, an advertiser attaches an abstract 31 of a predetermined number of lines created by the advertiser before a main body 32 of mail for distribution, and sends them from the advertiser server 2 to the mail server 1. At this time, the advertiser disposes an identification line 33 in a predetermined format representing the beginning of the abstract before the abstract 31, and an identification line 34 in a predetermined format representing the beginning of a main body before the main body 32 of mail. Because of the identification lines 33 and 34, the mail server 1 can determine whether or not the mail received from the advertiser server 2 contains an abstract. In the case where the received mail contains an abstract, the mail server 1 can determine which portion corresponds to the abstract.

The example in FIG. 6 is shown for an illustrative purpose. Any method for sending an abstract created by an advertiser to the mail server 1 can be used, and a main body and an abstract may not be sent in the same mail. Furthermore, in the present embodiment, only Rank C needs an abstract, so that only one kind of abstract is attached to the main body in the example shown in FIG. 6. However, in the case where varied abstracts are required depending upon distribution ranks, a plurality of kinds of abstracts in accordance with the respective ranks may be provided from the advertiser server 2.

In the case where the advertiser server 2 provides an abstract, the entire text of mail and the abstract are stored together in the distribution information storage part 11. In the case where the distribution rank is Rank C, the summarization processing part 13*a* extracts an abstract of the mail from the distribution information storage part 11 and uses it as a summarized result. Because of this, the abstract created by the advertiser is sent to the user terminal 3 through the sending/receiving control part 10.

The following may also be possible: each advertiser selects the use of an abstract created by the advertiser or the use of an abstract automatically created by the abstract processing part 13*a*; in the case where the advertiser selects the former, an extra fee will be collected from the advertiser, compared with the case of selecting the latter; thus, an amount to be billed with respect to the advertiser is varied in the billing processing part 18.

As described above, after mail is summarized in accordance with distribution ranks, the screen information generating part 13*b* generates HTML of a rank setting screen (Operation 5). FIG. 7 shows an example of a rank setting screen displayed by the display 4 of the user terminal 3. As shown in FIG. 7, the rank setting screen includes a rank setting column 41, a questionnaire inquiry column 42, a questionnaire answer column 43, a comment input column 44, and a determination button 45.

The rank setting column 41 is configured so that a user can select a distribution rank by selection input through a pull-down menu or the like. Similarly, the questionnaire answer column 43 displays previously prepared candidate answers through a pull-down menu or the like, so that a user can input an answer to the question displayed in the questionnaire inquiry column 2 by selection. A method for inputting a selection rank and an answer to a question is not limited to a selection system from a menu. A method for directly inputting a rank name and an answer to a question through operation keys, a hand-written letter recognition device, or the like may be adopted.

A menu of alternatives displayed in the questionnaire answer column 43 is previously set in accordance with the contents of the questionnaire inquiry column 42, and stored in the menu storage part 17. FIG. 8 shows an example of a menu displayed on the rank setting screen shown in FIG. 7. This example is a menu of alternatives corresponding to a question "please input a reason why you changed a rank" in the questionnaire inquiry column 42.

In the example shown in FIG. 8, a specific reason ID is provided to each alternative. This reason ID is sent from the user terminal 3 to the mail server 1 when a user selects either alternative as an answer to a question, and stored in the questionnaire result storage part 12b by the questionnaire result updating part 14b of the user information updating part 14, as described later.

As described above, in the case where each advertiser conducts its own survey in accordance with desire of the advertiser, a question set by each advertiser can be displayed in the questionnaire inquiry column 42a, and a customized menu prepared by the advertiser in accordance with the question can also be displayed in the questionnaire answer column 43. In this case, it is required to allow an advertiser to provide a questionnaire and a customized menu and to store them in the menu storage part 17.

Figures 9, 10:
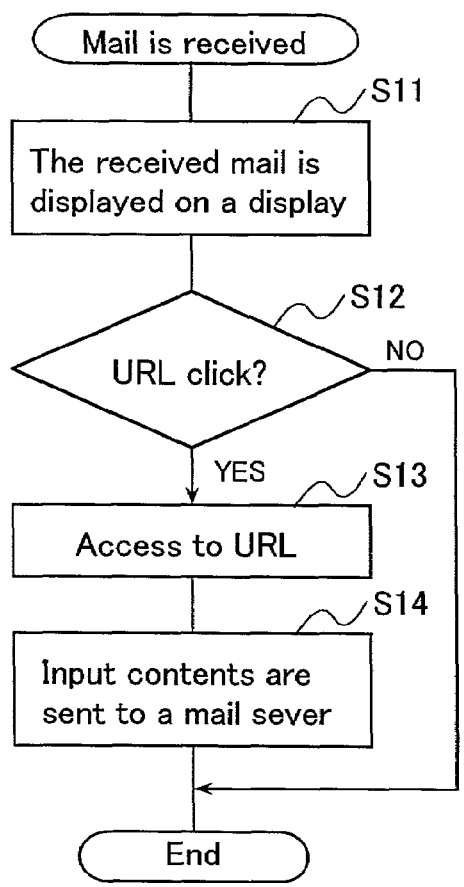
FIG. 9 illustrates an example of a customized menu displayed in a questionnaire column on the rank setting screen.
FIG. 10 is a flow chart showing an operation of a user terminal when mail is received.

For example, in the case where an advertiser is a computer shop, and its own survey as to what kind of information users want is conducted with respect to users, it is considered that the advertiser displays a question "what kind of information do you want more" in the questionnaire inquiry column 42, and displays a customized menu composed of alternatives of the contents as shown in FIG. 9 in a pull-down menu of the questionnaire answer column 43.

In this case, the advertiser previously sends a text to be displayed in the questionnaire inquiry column 42 and alternatives (customized menu) of answers to the question from the advertiser server 2 to the mail server 1. The mail server 1 attaches, for example, specific menu IDs to the received question text and customized menu thereof and stores them in the menu storage part 17. Each advertiser can also register a plurality of kinds of questions and customized menus in the menu storage part 17.

In the case where each advertiser conducts its own survey, when requesting distribution of mail from the advertiser server 2 to the mail server 1, each advertiser designates a question and a menu ID of a customized menu registered in the menu storage part 17 in the range of the distribution request. Because of this, the screen information generating part 13b of the distribution processing part 13 extracts a question text and a customized menu of the menu ID from the menu storage part 17, and generates HTML of the rank setting screen by using them at Operation 5.

The comment input column 44 is configured so that a user can freely input a comment. In order to enhance the effectiveness of a questionnaire, it is preferable that input to the rank setting column 41 and the questionnaire answer column 43 is necessary. However, input to the comment input column 44 may be arbitrarily determined by a user.

The distribution processing part 13 adds the URL of HTML of the rank setting screen generated as described above by the screen information generating part 13b to mail summarized by the summarization processing part 13a (Operation 6). The distribution processing part 13 sends mail to the user terminal 3 through the sending/receiving control part 10 at a timing according to the distribution rank (Operation 7).

Regarding mail in Rank C or D, the distribution processing part 13 integrates a plurality of pieces of mail into one piece of mail, adds URL to the mail at Operation 6, and performs Operation 7 at a predetermined timing (i.e., once a day).

Herein, an operation of the user terminal 3 that is a receiver of mail will be described. As shown in FIG. 10, when the user terminal 3 receives mail from the mail server 1, the user terminal 3 displays the received mail to the display 4, for example, as shown in FIG. 11 (Operation 11).

The example shown in FIG. 11 shows mail distributed in Rank A. Thus, in a leading portion 51 of a main body of mail distributed from the mail server 1, URL of a rank setting screen added at Operation 6 is displayed. Furthermore, a display rank 50 that shows in which distribution rank the mail has been distributed is also added to the mail by the distribution processing part 13. Because of this, it becomes easy for a user to determine whether or not setting or alteration of a distribution rank is conducted.

When a user sees mail displayed by the display 4, and desires to set a distribution rank regarding the subsequent distribution of the same kind of mail or desires to alter a currently designated distribution rank, the user clicks the displayed URL (YES at Operation 12). Because of this, the user terminal 3 accesses the URL, and a rank setting screen, for example, shown in FIG. 7 is displayed (Operation 13).

The user conducts input to the rank setting column 41, the questionnaire answer column 43, and the comment input column 44 on the rank setting screen, and clicks the determination button 45. Because of this, the distribution rank input by selection in the rank setting column 41, an answer to a question input by selection in the questionnaire answer column 43, and contents of a comment input to the comment input column 44 are sent from the user terminal 3 to the mail server 1 (Operation 14). At this time, a sender's address of mail that is a target for rank designation and the name of a user (mail address) who designates a rank are simultaneously sent to the mail server 1.

In the case where a distribution rank is Rank C or D, a plurality of pieces of mail are distributed together, and a display state of the display 4 of the user terminal 3 is, for example, as shown in FIG. 12. In this case, it is required that a distribution rank can be altered with respect to each of a plurality of pieces of mail. Furthermore, in the case where a user desires, it is preferable to provide an arrangement for retransmitting the entire text (original) of mail.

Figures 13, 14:
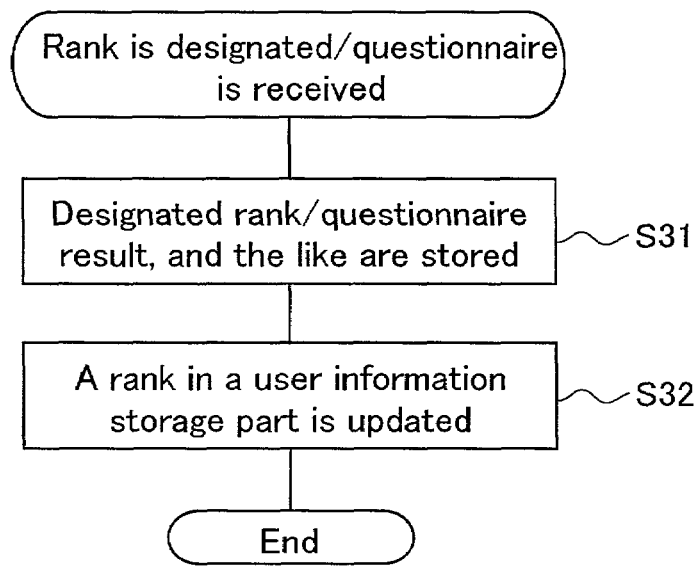
FIG. 13 illustrates an example of a screen for making a request for alteration of a rank or retransmission of an original of advertising mail in Rank C.
FIG. 14 is a flow chart showing an operation of the mail server when the designation of a rank and the answer to a question are received from a user terminal.

Therefore, in the case where a distribution rank is Rank C or D, the screen information generating part 13b of the mail server 1 generates HTML of a screen as shown in FIG. 13 at Operation 5 (see FIG. 4), and adds URL of the HTML to the leading portion 51 of the main body of mail at Operation 6. When the user clicks the URL portion, the screen shown in FIG. 13 is displayed by the display 4 of the user terminal. On this screen, regarding each of a plurality of pieces of mail listed on the screen in FIG. 12, check boxes 61 for checking in the case of desiring alteration of a rank or retransmission of an original are displayed with a sender's name and a subject name.

On the screen in FIG. 13, the user checks the check boxes 61 of the mail whose distribution rank the user desires to alter and the mail whose retransmission of an original the user desires, and presses the determination button 62. In the example shown in FIG. 13, the user desires alteration of a distribution rank with respect to the first displayed mail (mail from "sender 1") and the second mail (mail from "sender 2"), and desires retransmission of an original with respect to the third mail (mail from "sender 3"). Alteration of a distribution rank and retransmission of an original can also be conducted with respect to the identical mail.

When the determination button 62 is pressed, the user terminal 3 sends an instruction of requesting retransmission of an original of mail from "sender 3" to the mail server 1. This instruction is passed to the retransmission processing part 13c of the distribution processing part 13 through the sending/receiving control part 10. The retransmission processing part 13c extracts an original of mail sent from the above-mentioned "sender 3" from the distribution information storage part 11, and sends it to the user terminal 3 through the sending/receiving control part 10. A storage position (identifier, etc.) of an original of mail in the distribution information storage part 11 should be described in HTML on the screen shown in FIG. 13, and included in the instruction from the user terminal 3 to the retransmission processing part 13c.

In the HTML of the screen shown in FIG. 13, URL information of a rank setting screen with respect to each piece of mail listed on the screen is also described. Because of this, the user terminal 3 extracts the URL of the rank setting screen of mail whose alteration of a rank is checked from the HTML, and displays it on the rank setting screen. For example, in the example shown in FIG. 13, the user terminal 3 extracts the URL of the rank setting screen with respect to mail from "sender 1" and the URL of the rank setting screen with respect to mail from "sender 2" from the HTML. When the rank setting screen of mail from "sender 1" is first displayed, and the user completes input thereto, the rank setting screen of mail from "sender 2" is displayed.

Because of the above-mentioned arrangement, in the case of Rank C or D, alteration of a distribution rank and retransmission can be requested with respect to each of a plurality of pieces of mail to be distributed together.

Next, FIG. 14 shows an operation of the mail server 1 when the designation of a distribution rank, an answer to a question, and the like are received from the user terminal 3.

The data sent from the user terminal 3 to the mail server 1 contains (1) a user name (mail address), (2) a sender's address of mail that is a target for designation of a rank, (3) a designated distribution rank, (4) a reason ID of an answer selected by a user in the questionnaire answer column 43 of the rank setting screen, and (5) a text of a comment input to the comment input column 44. As described above, although the data (1) to (4) are required, data (5) is not required.

When the mail server 1 receives the above-mentioned data from the user terminal 3 through the sending/receiving control part 10, the user information updating part 14 updates the contents stored in the user information storage part 12 (Operation 31). More specifically, the distribution rank updating part 14a of the user information updating part 14 creates a record containing the above-mentioned data (1) to (3) in items, and adds it to the distribution rank storage part 12a of the user information storage part 12. In the case where a record containing a combination of the same user name and sender's address already exists, a distribution rank can be altered by overwriting the record.

Thus, the contents stored in the distribution rank storage part 12a are updated by the distribution rank updating part 14a, whereby summarization processing is conducted based on the distribution rank set or altered by the user when there is a subsequent request for distribution of mail from the same advertiser server 2.

Furthermore, the questionnaire result updating part 14b of the user information updating part 14 stores a reason ID of the above-mentioned (4), and a text of a comment of (5) in the questionnaire result storage part 12b under the condition that they are related with the user name and data of a sender stored in the distribution rank storage part 12a (Operation 32).

The rank information passing part 15a and the questionnaire information passing part 15b of the information passing part 15 totalizes the contents stored in the user information storage part 12 at a predetermined timing (e.g., once a day or once a week), and sends the totalized result to the advertiser server 2 of each advertiser through the sending/receiving control part 10. The rank information passing part 15a totalizes the contents stored in the distribution rank storage part 12a of the user information storage part 12, and the questionnaire information passing part 15b totalizes the contents stored in the questionnaire result storage part 12b.

FIG. 15 shows an example of the contents totalized by the information passing part 15. In this example, ranks designated by respective users, answers to a question, and the contents of comments are totalized on an advertiser basis. Herein, the answers to a question are represented by reasons IDs; however, in the case of transmission to the advertiser server 2, the reasons IDs may be replaced by corresponding texts (see FIGS. 8 and 9). Furthermore, the contents of information passed to an advertiser are not limited thereto. For example, a user name may be replaced by an anonym, a proportion of users who have selected each Rank (A to E) among all the users is calculated, the number of each reason ID is totalized to be noticed, and the like. Thus, the results of arbitrary data processing conducted as required can be passed.

By sending evaluation by users based on designated ranks and answers to a question to each advertiser, each advertiser can efficiently obtain evaluation by users, questionnaire results, and the like with respect to advertising mail, etc.

As described above, according to the mail distribution system of the present embodiment, a user allows the contents of advertising mail or the like that is distributed periodically and contains a large amount of information to be summarized and distributed in accordance with a degree of interest and the like by designating a distribution rank. A distribution rank can be designated by a simple operation on a rank setting screen displayed by the display 4 of the user terminal 3. Alteration of a once designated rank is also easy.

Because of this, particularly, in the case where the user terminal 3 is a mobile phone terminal that has a display smaller than that of a computer terminal and a constraint in an input device (operation key), inconvenience such as an increase in a cost burden upon receiving a large amount of advertising mail and the like, and time and trouble for confirming mail, can be effectively eliminated.

Furthermore, in the above-mentioned description, in the case of mail whose distribution rank is not designated, the standard rank determining part 16 conducts initial setting of a predetermined rank uniformly; however, the present invention is not limited thereto. A distribution rank may be determined based on the evaluation by other users with respect to the mail.

In this case, the standard rank determining part 16 refers to the contents stored in the distribution rank storage part 12*a*, and determines a distribution rank based on a rank selected by other users with respect to the mail.

For example, the following method can be considered: in the case of evaluation in 5 levels (Ranks A to E), evaluation by each user is converted into points so that a higher additional point is assigned to a higher rank; advertisers are ranked in a decreasing order of the aggregated points; a distribution rank of the upper 10% advertisers is prescribed to be Rank A, the subsequent 45% is prescribed to be Rank B, the subsequent 35% is prescribed to be Rank C, and the remaining 10% is prescribed to be Rank D. It is appreciated that a percentage allocated to each rank is arbitrarily determined. Furthermore, in this case, if mail whose distribution rank is set by this method is limited to the mail that is distributed to users in a predetermined number or more and evaluated as Rank B or lower by either user, a distribution rank appropriately reflecting the evaluation by users can be determined.

The present embodiment does not limit the present invention, and can be varied within the scope of the invention. For example, in the above description, a configuration has been illustrated in which an information distribution apparatus that mediates distribution of information from a sending apparatus to a receiving apparatus is realized only one mail server. However, an additional apparatus such as a transfer server and a mediator server may be disposed between the sending apparatus and the receiving apparatus. In this case, a part of the function of the mail server shown in FIG. 2 and the like in the present embodiment can be conducted by the additional apparatus.

Furthermore, in the above description, URL of a rank setting screen is added to a leading portion of a main body of mail, and the rank setting screen is displayed by clicking the URL. However, the rank setting screen may be displayed together with the main body of mail.

Furthermore, in the above description, a user conducts setting of a rank on the rank setting screen (WEB page). The present invention is not limited thereto. A rank may be set by sending electronic mail in a particular format to a particular address.

Furthermore, in the above description, in the user information storage part 12, a record containing a user name, a sender's address and a distribution rank is stored in the distribution rank storage part 12*a*, and a reason ID of an answer to a question and a text of a comment are stored by being related to the user name and the sender's address in the questionnaire result storage part 12*b*. However, the other information may be stored, and a data configuration is not limited to the above-mentioned example.

As described above, according to the present invention, by adjusting the amount of information to be sent to a receiver in accordance with receiver's desire, an information distribution apparatus capable of enhancing convenience of a receiver can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information distribution apparatus for mediating distribution of information received from a sending apparatus of a sender and distributed to a receiving apparatus of a receiver, comprising:
   a sending/receiving control part conducting communication via a network with the sending apparatus and the receiving apparatus;
   a distribution rank storage part storing a distribution rank selected in advance by the receiver, before receiving distribution information from the sender, with respect to the distribution information from the sender, among distribution ranks defining distribution conditions containing designation of a summarization degree of distribution information in a plurality of levels;
   a distribution information storage part storing an original of distribution information received from the sending apparatus;
   a summarization processing part, when receiving a request for distribution of stored distribution information received from the sending apparatus through the sending/receiving control part, obtaining from the distribution rank storage part a distribution rank previously selected by the receiver of the stored distribution information and selected based on its correspondence to the sender of the distribution information, conducting summarization processing of the distribution information stored in the distribution information storage part in accordance with designation of a summarization degree corresponding to the distribution rank obtained and giving the distribution information, after processing by the summarization processing part, to the sending/receiving control part to distribute the distribution information to the receiving apparatus;
   an image information generating part adding, to each distribution information, screen definition information of a rank setting screen allowing a receiver to input the distribution rank by selection, or access information to the rank setting screen; and
   a distribution rank updating part updating the distribution rank stored in the distribution rank storage part, based on an input distribution rank which a receiver inputs by selection on the rank setting screen regarding the distribution information upon receiving the distribution information,
   wherein the summarizing of the distribution information further comprises extracting at least a portion of the distribution information according to the distribution rank.

2. An information distribution apparatus according to claim 1, wherein the distribution conditions further include designation of a distribution time.

3. An information distribution apparatus according to claim 1, comprising a retransmission processing part receiving a request for transmission of an original of distribution information from a receiver of distribution information subjected to the summarization processing, extracting an original stored in the distribution information storage part, and distributing the original to the receiving apparatus through the sending/receiving control part.

4. An information distribution apparatus according to claim 1, comprising a rank information passing part totalizing distribution ranks stored in the distribution rank storage part, and sending the totalized result to the sending apparatus through the sending/receiving control part.

5. An information distribution apparatus according to claim 1, wherein the rank setting screen includes a questionnaire column in addition to a selection column of the distribution rank, the information distribution apparatus comprising:
- a questionnaire result storage part storing answer data to the questionnaire column;
- a questionnaire record updating part receiving answer data to the questionnaire column from the receiving apparatus through the sending/receiving control part, and updating contents stored in the questionnaire result storage part; and
- a questionnaire information passing part totalizing questionnaire results stored in the questionnaire result storage part, and sending the totalized result to the sending apparatus through the sending/receiving control part.

6. An information distribution apparatus according to claim 5, comprising a menu storage part storing predetermined questionnaire contents and questionnaire contents provided by each sender, wherein questionnaire contents to be displayed in the questionnaire column on the rank setting screen are selected by each sender from questionnaire contents stored in the menu storage part.

7. An information distribution apparatus according to claim 1, wherein the distribution rank storage part includes a region for storing a distribution rank selected by each receiver on a sender basis or on the basis of the kind of information distributed from each sender.

8. An information distribution apparatus according to claim 1, wherein summarization processing of distribution information by the summarization processing part is either one of the following processing selected by each sender: processing of conducting summarization based on a predetermined rule and processing of outputting an abstract previously provided together with the distribution information in accordance with each distribution rank from the sender as a summarized result.

9. An information distribution apparatus according to claim 1, comprising a standard rank determining part determining an initial distribution rank based on evaluation by a plurality of receivers.

10. The information distribution apparatus according to claim 1, wherein the distribution conditions include a summarization degree selected from summarization degrees of the distribution information in the plurality of levels and designation of a distribution time of the distribution information.

11. An information distribution method for mediating distribution of information received from a sending apparatus of a sender and distributed to a receiving apparatus of a receiver, comprising:
- storing a distribution rank selected in advance by the receiver, before receiving distribution information from the sender, with respect to the distribution information from the sender, among distribution ranks defining distribution conditions containing designation of a summarization degree of distribution information in a plurality of levels, in a distribution rank storage part;
- when receiving a request for distribution of distribution information received from the sending apparatus, obtaining from the distribution rank storage part a distribution rank previously selected by the receiver of the distribution information and selected based on its correspondence to the sender of the distribution information;
- summarizing the distribution information in accordance with designation of a summarization degree corresponding to the obtained distribution rank to send it to the receiving apparatus and giving the distribution information after summarizing the distribution information to a sending/receiving control part to distribute the distribution information to the receiving apparatus;
- adding, to each distribution information, screen definition information of a rank setting screen displayable by a receiving apparatus allowing a receiver to input the distribution rank by selection or access information to the rank setting screen; and
- updating the distribution rank stored in the distribution rank storage part, based on a distribution rank which a receiver inputs by selection on the rank setting screen regarding the distribution information upon receiving the distribution information,
- wherein the summarizing of the distribution information further comprises extracting at least a portion of the distribution information according to the distribution rank.

12. An information distribution method according to claim 11, comprising:
- when receiving a request for distribution of information from the sending apparatus, storing an original of the distribution information in a distribution information storage part;
- when receiving a request for sending an original of distribution information from a receiver of distribution information subjected to the summarization processing, extracting an original stored in the distribution information storage part to distribute it to the receiving apparatus.

13. An information distribution method according to claim 11, wherein distribution ranks stored in the distribution rank storage part are summarized as selection results of a plurality of receivers and sent to a sending apparatus.

14. The information distribution method according to claim 11, wherein the distribution conditions include a summarization degree selected from summarization degrees of the distribution information in the plurality of levels and designation of a distribution time of the distribution information.

15. An information distribution method according to claim 11, wherein the rank setting screen includes a questionnaire column as well as a selection column of the distribution rank,
- answer data to the questionnaire column is received together with the selection result of the distribution rank from the receiving apparatus, and the received answer data is stored in a questionnaire result storage part, and
- results of a questionnaire stored in the questionnaire result storage part are summarized and sent to the sending apparatus.

16. An information distribution method according to claim 15, wherein predetermined questionnaire contents and questionnaire contents provided by each sender are stored in a menu storage part, and questionnaire contents selected by each sender from the menu storage part is displayed in the questionnaire column on the rank setting screen.

17. An information distribution method according to claim 11, wherein the distribution rank is selected by each receiver on a sender basis or on the basis of a kind of information distributed from each sender.

18. An information distribution method according to claim 11, wherein summarization processing of the distribution information is either one of the following processing selected by each sender: processing of conducting summarization based on a predetermined rule and processing of outputting an abstract previously provided together with the distribution information in accordance with each distribution rank from the sender as a summarized result.

19. An information distribution method according to claim 11, wherein an initial distribution rank is determined based on evaluation by a plurality of receivers.

20. A computer program product storing, in a recording medium, a program for allowing a computer to execute a processing of mediating distribution of information received from a sending apparatus of a sender and sent to a receiving apparatus of a receiver, the processing comprising:

when receiving a request for distribution of distribution information received from the sending apparatus, storing an original of the distribution information received from the sending apparatus in a distribution information storage part;

obtaining, from a distribution rank storage part, a distribution rank, selected before receiving the distribution information from the sender, defining distribution conditions containing designation of a summarization degree of the distribution information in a plurality of levels, previously selected by the receiver of the distribution information and obtained based on its correspondence to the sender of the distribution information from the sender;

summarizing the distribution information stored in the distribution information storage part in accordance with designation of a summarization degree corresponding to the obtained distribution rank, and distributing the summarized distribution information to the receiving apparatus and giving the distribution information after the summarizing the distribution information to a sending/receiving control part to distribute the distribution information to the receiving apparatus;

adding, to each distribution information, screen definition information of a rank setting screen displayed by a receiving apparatus allowing a receiver to input the distribution rank by selection or access information to the rank setting screen; and updating the distribution rank stored in the distribution rank storage part, based on a distribution rank which a receiver inputs by selection on the rank setting screen regarding the distribution information upon receiving the distribution information, wherein the summarizing of the distribution information further comprises extracting at least a portion of the distribution information according to the distribution rank.

21. The computer program product according to claim 20, wherein the distribution conditions include a summarization degree selected from summarization degrees of the distribution information in the plurality of levels and designation of a distribution time of the distribution information.

* * * * *